United States Patent
Seth et al.

(10) Patent No.: US 10,118,363 B2
(45) Date of Patent: *Nov. 6, 2018

(54) ANTISLIP SHEET MATERIAL WITH TWISTED TAPES

(71) Applicant: Owens Corning Intellectual Capital, LLC, Toledo, OH (US)

(72) Inventors: Manish K. Seth, Mission (CA); Martin Vido, Mission (CA)

(73) Assignee: OWENS CORNING INTELLECTUAL CAPITAL, LLC, Toledo, OH (US)

(*) Notice: Subject to any disclaimer, the term of this patent is extended or adjusted under 35 U.S.C. 154(b) by 71 days.

This patent is subject to a terminal disclaimer.

(21) Appl. No.: 15/211,047

(22) Filed: Jul. 15, 2016

(65) Prior Publication Data

US 2016/0325522 A1 Nov. 10, 2016

Related U.S. Application Data

(62) Division of application No. 12/740,908, filed as application No. PCT/CA2008/001938 on Nov. 5, 2008.

(Continued)

(51) Int. Cl.
*B32B 5/02* (2006.01)
*B32B 27/12* (2006.01)
(Continued)

(52) U.S. Cl.
CPC .............. *B32B 5/024* (2013.01); *B32B 3/263* (2013.01); *B32B 3/30* (2013.01); *B32B 5/14* (2013.01);
(Continued)

(58) Field of Classification Search
CPC .......... D03D 1/04; D03D 3/005; D03D 13/00; D03D 15/0088; D03D 15/00;
(Continued)

(56) References Cited

U.S. PATENT DOCUMENTS

| 1,990,840 A | 2/1935 | Protz |
| 2,052,808 A | 9/1936 | Spokes |

(Continued)

FOREIGN PATENT DOCUMENTS

| GB | 449990 | 7/1936 |
| GB | 774566 | 5/1957 |

(Continued)

OTHER PUBLICATIONS

Office action from U.S. Appl. No. 15/211,038 dated Feb. 12, 2018.

(Continued)

*Primary Examiner* — Elizabeth M Cole
(74) *Attorney, Agent, or Firm* — Calfee, Halter & Griswold LLP

(57) ABSTRACT

A sheet of material suitable for roofing or industrial wrapping applications has an anti-skid surface formed by ridges of twisted tapes. The sheet comprises a woven scrim of warp tapes and weft tapes. Some of the tapes are twisted about their longitudinal axis, for example about (25) to (400) revolutions per meter, to form ridges having a height substantially greater than the thickness of the tapes. The ridges impart an anti-skid surface to the sheet. The scrim is bonded to a coating or film to make the sheet waterproof.

6 Claims, 4 Drawing Sheets

Related U.S. Application Data

(60) Provisional application No. 60/985,604, filed on Nov. 5, 2007.

(51) Int. Cl.

| | | |
|---|---|---|
| *D03D 15/00* | (2006.01) | |
| *D03D 15/10* | (2006.01) | |
| *D06N 3/00* | (2006.01) | |
| *E04D 12/00* | (2006.01) | |
| *D06N 5/00* | (2006.01) | |
| *B32B 5/14* | (2006.01) | |
| *B32B 7/04* | (2006.01) | |
| *B32B 25/10* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 3/26* | (2006.01) | |
| *B32B 3/30* | (2006.01) | |

(52) U.S. Cl.
CPC .............. *B32B 7/045* (2013.01); *B32B 25/10* (2013.01); *B32B 27/12* (2013.01); *B32B 27/302* (2013.01); *B32B 27/306* (2013.01); *B32B 27/308* (2013.01); *B32B 27/32* (2013.01); *B32B 27/34* (2013.01); *B32B 27/36* (2013.01); *D03D 15/00* (2013.01); *D03D 15/0033* (2013.01); *D03D 15/0088* (2013.01); *D03D 15/10* (2013.01); *D06N 3/0002* (2013.01); *D06N 5/00* (2013.01); *E04D 12/002* (2013.01); *B32B 2262/023* (2013.01); *B32B 2262/0207* (2013.01); *B32B 2262/0223* (2013.01); *B32B 2262/0246* (2013.01); *B32B 2262/0253* (2013.01); *B32B 2262/0276* (2013.01); *B32B 2307/402* (2013.01); *B32B 2307/54* (2013.01); *B32B 2307/582* (2013.01); *B32B 2307/71* (2013.01); *B32B 2307/744* (2013.01); *B32B 2419/00* (2013.01); *B32B 2419/06* (2013.01); *B32B 2553/00* (2013.01); *D06N 2209/103* (2013.01); *D06N 2209/106* (2013.01); *D10B 2321/02* (2013.01); *D10B 2321/021* (2013.01); *D10B 2321/022* (2013.01); *D10B 2321/121* (2013.01); *D10B 2331/02* (2013.01); *D10B 2331/04* (2013.01); *D10B 2401/063* (2013.01); *Y10T 428/24636* (2015.01)

(58) Field of Classification Search
CPC .... D03D 15/0033; D03D 15/10; B32B 5/024; B32B 27/306; B32B 5/14; B32B 7/045; B32B 25/10; B32B 27/302; B32B 27/308; B32B 27/32; B32B 27/34; B32B 27/36; B32B 3/263; B32B 3/30; B32B 27/12; B32B 2307/582; B32B 2262/0246; B32B 2307/71; B32B 2262/0223; B32B 2419/00; B32B 2419/06; B32B 2553/00; B32B 2262/023; B32B 2262/0207; B32B 2262/0253; B32B 2262/0276; B32B 2307/402; B32B 2307/54; B32B 2307/744; D06N 5/00; D06N 3/0002; D06N 2209/103; D06N 2209/106; E04D 12/002; Y10T 428/24636; D10B 2321/021; D10B 2321/02; D10B 2321/022; D10B 2321/121; D10B 2331/02; D10B 2331/04; D10B 2401/063

See application file for complete search history.

(56) References Cited

U.S. PATENT DOCUMENTS

| | | |
|---|---|---|
| 2,999,297 A | 9/1961 | Schwarts |
| 3,445,055 A | 5/1969 | Morton et al. |
| 4,637,949 A | 1/1987 | Manning et al. |
| 4,837,387 A | 6/1989 | Van de Pol |
| 5,187,004 A | 2/1993 | Risseeuw |
| 6,143,675 A | 11/2000 | McCollam et al. |
| 2004/0261883 A1 | 12/2004 | Harrison |
| 2005/0260906 A1 | 11/2005 | Chang |

FOREIGN PATENT DOCUMENTS

| | | |
|---|---|---|
| GB | 889875 | 2/1962 |
| GB | 2277939 | 11/1994 |
| JP | 1040634 | 2/1989 |
| JP | 3007896 | 1/1991 |
| JP | 6184860 | 7/1994 |
| JP | 2756842 | 5/1998 |
| JP | 2003253533 | 9/2003 |
| WO | 2006/084355 | 8/2006 |

OTHER PUBLICATIONS

Notice of Allowance from U.S. Appl. No. 12/740,908 dated Apr. 4, 2018.
International Search Report and Written Opinion from PCT/CA2008/001938 dated Feb. 20, 2009.
Office action from U.S. Appl. No. 12/740,908 dated Sep. 27, 2012.
Office action from U.S. Appl. No. 12/740,908 dated May 16, 2013.
Advisory action from U.S. Appl. No. 12/740,908 dated Sep. 16, 2013.
Office action from U.S. Appl. No. 12/740,908 dated Nov. 18, 2014.
Office action from U.S. Appl. No. 12/740,908 dated Jul. 8, 2015.
Office action from U.S. Appl. No. 12/740,908 dated Mar. 30, 2016.
Advisory action and Interview Summary from U.S. Appl. No. 12/740,908 dated Aug. 2, 2016.
Office action from U.S. Appl. No. 12/740,908 dated Nov. 18, 2016.
Office action from U.S. Appl. No. 12/740,908 dated May 18, 2017.
Advisory action and Interview Summary from U.S. Appl. No. 12/740,908 dated Sep. 1, 2017.
Notice of Allowance from U.S. Appl. No. 12/740,908 dated Oct. 12, 2017.
Office action from U.S. Appl. No. 15/211,038 dated Jul. 27, 2017.
Office Action from U.S. Appl. No. 15/211,038 dated May 30, 2018.
Office Action from U.S. Appl. No. 15/211,057 dated Apr. 19, 2018.
Office Action from U.S. Appl. No. 15/211,057 dated Jun. 20, 2018.

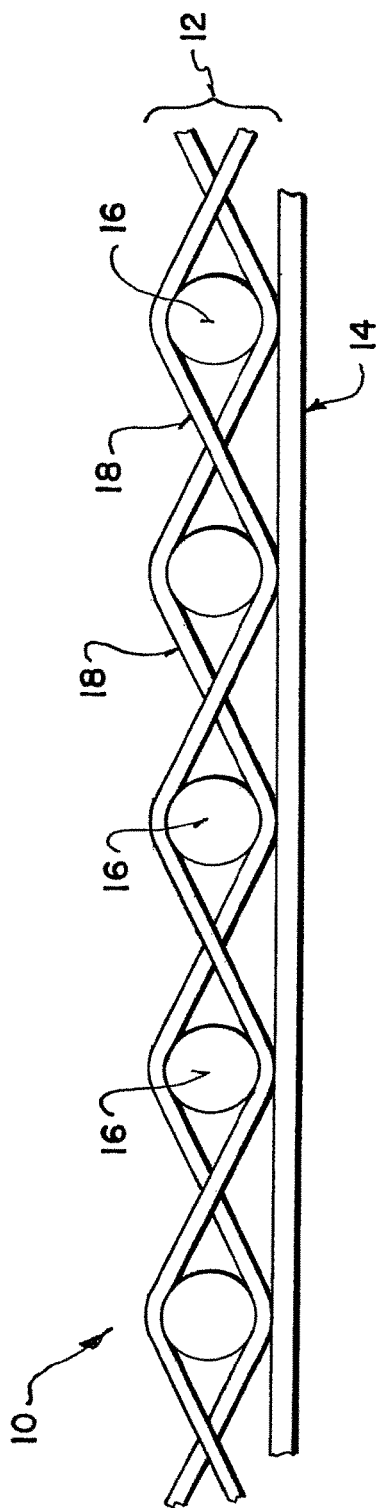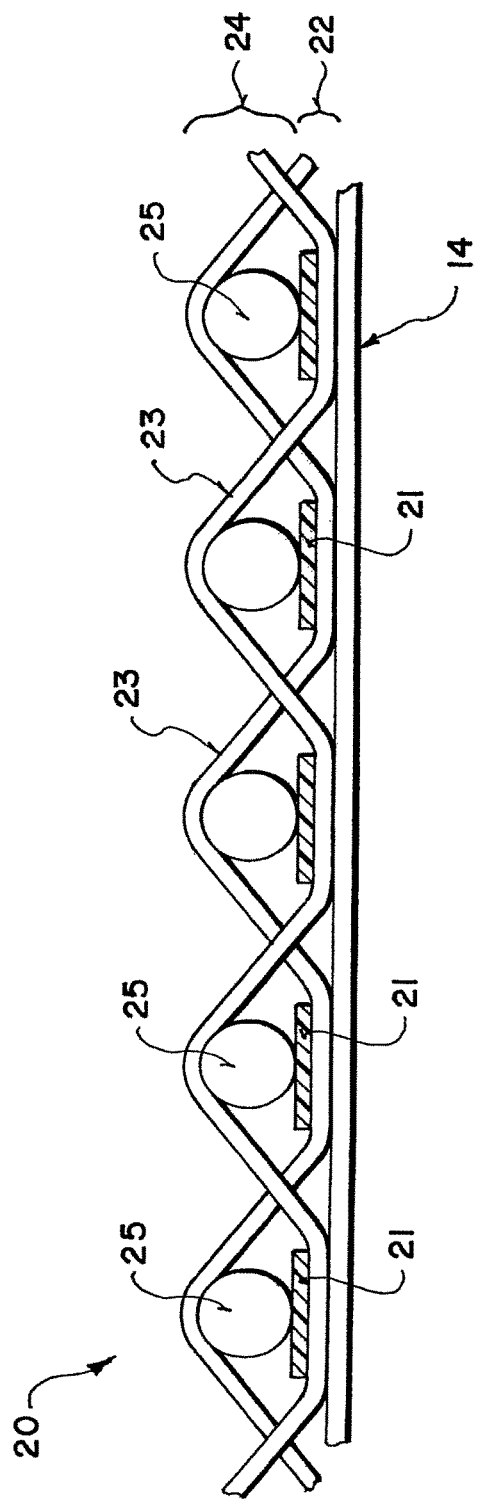

ANTISLIP SHEET MATERIAL WITH TWISTED TAPES

RELATED APPLICATIONS

This application is a divisional application of U.S. Ser. No. 12/740,908 filed on Apr. 30, 2010, titled ANTISLIP SHEET MATERIAL WITH TWISTED TAPES, which is the is the U.S. national phase entry of PCT/CA08/01938, with an international filing date of Nov. 5, 2008, which claims the benefit of U.S. Provisional Patent Application No. 60/985,604, filed on Nov. 5, 2007, the entire disclosures of which are incorporated herein by reference.

TECHNICAL FIELD OF THE INVENTION

The invention pertains to sheet materials made of plastic tapes, suitable for roofing, wrapping and other applications. More particularly, it pertains to such sheet materials having a surface with a high coefficient of friction.

BACKGROUND OF THE INVENTION

Sheet materials comprising a scrim of woven plastic tapes are commonly used for roofing and industrial wrapping applications. The sheet materials may be coated or uncoated. Such materials typically have a relatively smooth surface with a low coefficient of friction. For some applications, it is useful for the sheet material to have antislip properties. For example, if the sheet is to be applied to a roof deck, e.g. as a roofing underlayment, a surface with antislip properties on which workers may walk enhances worker safety. Likewise, if the sheet material is to be use to wrap goods such as bundles of lumber, on which workers may need to walk, an antislip surface is useful. The conventional methods of imparting antislip properties to sheet materials involve applying films, meshes or granules to the surface of the sheet.

SUMMARY OF THE INVENTION

The invention provides a sheet material comprising a scrim made of woven plastic tapes, in which at least some of the tapes comprising the scrim are twisted to create ridges and thus impart an enhanced coefficient of friction to a surface of the sheet. The sheet material provides enhanced slip-resistance in wet, dry or dusty conditions. The sheet material is useful for applications such as industrial wrapping, packaging and roofing underlayments.

The invention provides a sheet of material having an anti-skid surface, comprising a first set of tapes generally parallel to each other and a second set of tapes generally parallel to each other and perpendicular to the first set of tapes. The tapes are plastic and have a width greater than their thickness. The tapes of the first set and of the second set are interwoven with each other to form a scrim. At least some of the tapes of the first set are twisted about their longitudinal axis to form a plurality of parallel ridges having a height at least five times greater than the thickness of untwisted tapes, the ridges forming the anti-skid surface of the sheet.

According to another embodiment of the invention, there is provided a sheet of material having an anti-skid surface comprising a first set of tapes generally parallel to each other, a second set of tapes generally parallel to each other and perpendicular to the first set of tapes, and a third set of tapes generally parallel to the first set of tapes. The tapes are plastic and have a width greater than their thickness. The tapes of the first set and of the third set are interwoven with the tapes of the second set to form a scrim. At least some of the tapes of the third set are twisted about their longitudinal axis to form a plurality of parallel ridges having a height at least five times greater than the thickness of untwisted tapes, the ridges forming the anti-skid surface of the sheet. Each tape of the first set is positioned adjacent to and following a weaving path the same as that of a respective tape of the first set.

BRIEF DESCRIPTION OF THE DRAWINGS

FIG. 2 is a cross-sectional view on the line 2-2 of FIG. 1.

FIG. 3 a cross-sectional view of a second embodiment of the invention.

DETAILED DESCRIPTION OF THE PREFERRED EMBODIMENTS

Exemplary embodiments are illustrated in the referenced figures of the drawings. It is intended that the embodiments are to be considered illustrative rather than restrictive.

Figure 1:
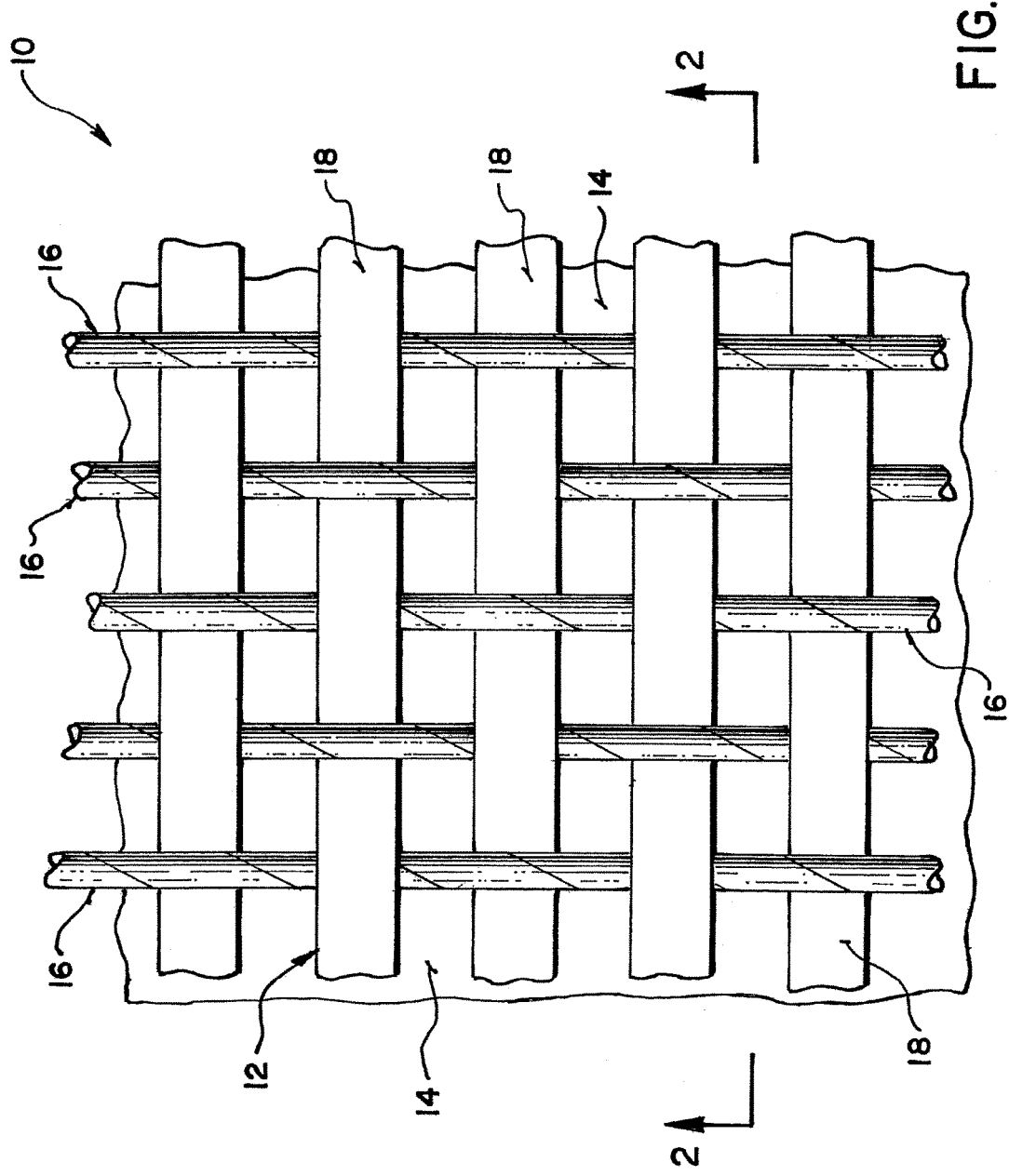
FIG. 1 is a plan view of a sheet according to a first embodiment of the invention.

Referring to FIGS. 1 and 2, the sheet material 10 has a scrim 12 coated on one side by a coating layer 14. The scrim 12 is woven in a plain weave of warp tapes 16 and weft tapes 18. The weft tapes 18 are laid flat in the weave, in the conventional manner. The warp tapes 16 are twisted, such that they describe full revolutions about their longitudinal axis along the length of the weave. The frequency of the twisting is about one revolution every centimeter. Preferred frequencies of such twisting are in the range of 25 to 400 revolutions per meter. Some of the twisted tapes can have different frequencies of twisting from others.

The thickness of the tapes comprising the scrim is about 1 to 2 mils (0.025 to 0.05 mm). However, when twisted, the effective thickness of the warp tapes 16 is about 10 to 20 mils (0.25 to 0.5 mm). The warp tapes 16 accordingly form ridges, having a height of about 10 to 20 mils, running along the warp direction of the sheet 10, which provide an increased coefficient of friction to the surface of the sheet. To form an effective anti-skid surface, the height of the ridges should be at least about five times greater than the thickness of the tapes, alternatively at least about ten times greater.

The scrim 12 and the coating 14 are made of plastic, poly olefin resins, for example polyethylene or polypropylene. They may alternatively be made of various other plastics, including polyesters, polystyrene, nylon and ethylene acrylic copolymers. Alternatively, the scrim and/or the coating 14 may comprise a high coefficient-of-friction material, for example ethylene vinyl acetate (EVA), ethylene methyl acrylate (EMA), rubber or elastomer. The scrim provides a structural layer having high tensile and tear strength.

The tapes 16, 18 are conventional extruded plastic tapes having a flat profile and a width greater than their thickness. The tape width is preferably about 1.5 to 6 mm. The number of tapes per inch in the machine direction and in the cross direction is in the range of 1 to 25. Tapes that are to be twisted may be the same width and thickness as tapes that are not to be twisted, or they may have a greater width and/or thickness.

The frequency of twisting of the warp tape 16, and the thickness and denier of the tapes 16, 18 can be selected to achieve the desired coefficient of friction of the anti-skid surface of the sheet 10.

The coating layer 14 is a waterproof film bonded to the scrim. It may be permeable to water vapor to allow the escape of moisture from buildings when the sheet is used as a roofing underlayment or for similar applications. The coating layer 14 is manufactured in-situ using a co-extrusion process and is laminated to the scrim 12, or it can comprise a film that is bonded to the scrim, for example by thermal bonding, lamination or adhesive. Optionally, a second coating layer is bonded to the opposite side of the scrim.

FIG. 3 illustrates an embodiment of the invention in which twisted warp tapes are added to a scrim woven with conventional untwisted warp and weft tapes. The sheet material 20 comprises a scrim 22 with a coating layer 14 laminated thereto. The scrim 22 is woven of untwisted warp tapes 21 and untwisted weft tapes 23 in a plain weave. Twisted warp tapes 25 are woven into this scrim, the twisted warp tapes 25 being laid on top of and following the same weaving path as the untwisted warp tapes 21, interweaving with the weft tapes 23 of the scrim. The twisted warp tapes 25 form a twisted warp layer 24. This layer 24 comprises ridges formed by the twisted warp tapes 25, imparting an enhanced coefficient of friction to the upper surface of the sheet 20.

Figure 4:
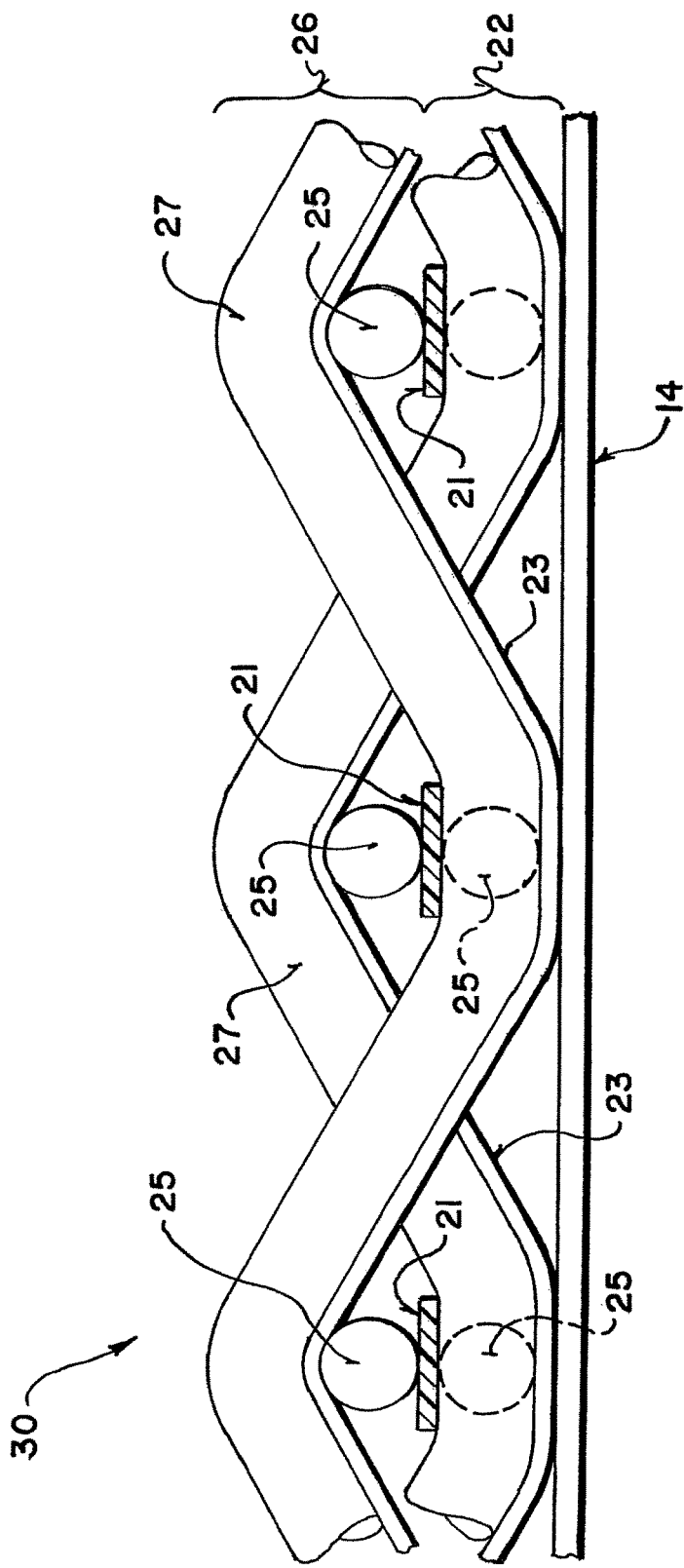
FIG. 4 is a cross-sectional view of a third embodiment of the invention.

FIG. 4 illustrates a further embodiment of the invention in which both twisted warp tapes and twisted weft tapes are added to a scrim woven with conventional untwisted warp and weft tapes. The sheet material 30 comprises a scrim 22 with a coating layer 14 laminated thereto. The scrim 22 is woven of untwisted warp tapes 21 and untwisted weft tapes 23 in a plain weave. Twisted warp tapes 25 and twisted well tapes 27 are woven into this, the twisted warp tapes being laid on top of and following the same path as the untwisted warp tapes 21, and the twisted well tapes 27 being laid on top of and following the same weaving path as the untwisted well tapes 23. The twisted warp tapes 25 and twisted weft tapes 27 form a layer 26 which comprises ridges formed by the twisted warp tapes and twisted well tapes, imparting an enhanced coefficient of friction to the upper surface of the sheet 30.

Figure 5:
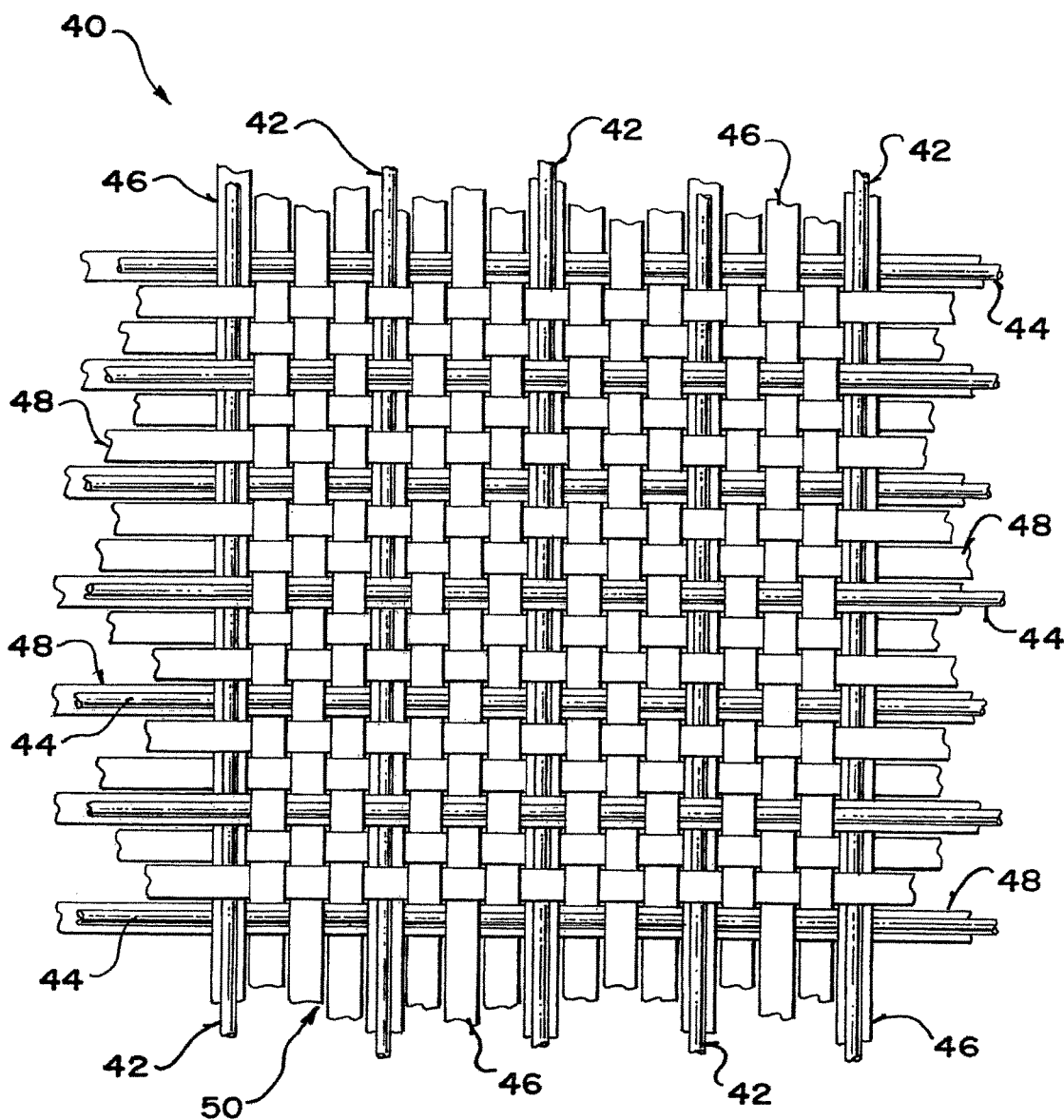
FIG. 5 is a plan view of a fourth embodiment of the invention.

FIG. 5 illustrates a further embodiment of the invention in which the sheet material 40 comprises a scrim 50 with a coating layer 14 (not shown) laminated thereto. The scrim 50 includes twisted warp tapes 42 and twisted well tapes 44, and untwisted warp tapes 46 and untwisted well tapes 48. The twisted warp tapes replace every fourth untwisted warp tape, and the twisted weft tapes replace every third untwisted well tape, in the example shown. Alternatively, the twisted tapes may be placed at different intervals, for example replacing every wrap and/or well tape, or every second or every fifth, etc. warp and/or well tape.

In the sheet materials of the invention, either or both of the warp and weft tapes can be twisted; and the sheet material can be uncoated, coated on one side or on both sides; and it can include additional layers, depending on the properties desired for a particular application.

Some further features and embodiments of the invention include the following:

(a) The well tapes are twisted and the warp tapes are untwisted;
(b) Both the warp tapes and the well tapes are twisted;
(c) Each warp (and/or weft) tape is twisted, or every second or third etc. warp (and/or weft) tape is twisted and the others are untwisted;
(d) Where twisted tapes are added to a scrim made of untwisted tapes (as in FIGS. 3 and 4) the added twisted tapes may be in the machine direction or in the cross direction or both;
(e) The scrim is uncoated, or coated on one side, or coated on both sides, or includes additional layers;
(f) The weave of the scrim is plain, twill or other weaves;
(g) The color of the twisted tapes is the same as the surrounding fabric to blend in with it; or it is different to make the antislip grid more visible;
(h) The twisted tapes are applied to the whole of a sheet or to only a part of it;
(i) Adjacent twisted tapes have different frequencies of turning, for example some have relatively more and some have relatively fewer revolutions per meter, creating a rougher surface with ridges of different heights;
(j) The twisted tapes or the coating, or both, are treated with or comprise a tacky or high coefficient-of-friction coating or additive. For example, they may incorporate ethylene vinyl acetate (EVA), ethylene methyl acrylate (EMA), rubber or elastomer; and/or
(k) The sheet material includes additives or is treated to provide UV-resistance.

Although the invention has been described in terms of various embodiments, it is not intended that the invention be limited to these embodiments. Various modifications within the scope of the invention will be apparent to those skilled in the art. The scope of the invention is defined by the claims that follow.

The invention claimed is:

1. A sheet of material having an anti-skid surface, comprising:
   a first set of tapes generally parallel to each other;
   a second set of tapes generally parallel to each other and perpendicular to the first set of tapes;
   wherein the tapes of the first set and the second set are plastic and have a width greater than their thickness, and wherein the tapes of the first set and the second set are interwoven with each other to form a scrim;
   wherein every fourth tape of the first set is twisted to form a first plurality of spaced apart parallel ridges, wherein each of the twisted tapes has a plurality of tape revolutions, wherein each tape revolution overlies an adjacent tape revolution to form a circular cross-section about its longitudinal axis, wherein each of the twisted tapes has a width greater than 4 mm and less than 6 mm, and wherein each of the twisted tapes is twisted between about 250 revolutions per meter and about 400 revolutions per meter;
   wherein a height of the first plurality of ridges is at least five times greater than the thickness of untwisted tapes;
   wherein every third tape of the second set is twisted to form a second plurality of spaced apart parallel ridges, wherein each of the twisted tapes has a plurality of tape revolutions, wherein each tape revolution overlies an adjacent tape revolution to form a circular cross-section about its longitudinal axis, wherein each of the twisted tapes has a width greater than 4 mm and less than 6 mm, and wherein each of the twisted tapes is twisted between about 250 revolutions per meter and about 400 revolutions per meter;
   wherein a height of the second plurality of ridges is at least five times greater than the thickness of untwisted tapes;
   wherein the first and second pluralities of spaced apart parallel ridges form an anti-skid contour of the sheet;

a film bonded to the scrim by lamination, wherein said film comprises a high coefficient of friction elastomer.

2. The sheet material of claim 1, wherein the twisted tapes and the untwisted tapes of the first set have the same width.

3. The sheet material of claim 1, wherein the twisted tapes of the second set have different widths than other tapes of the second set.

4. The sheet material of claim 1, wherein each of the first and second sets have 1 to 25 tapes per inch.

5. The sheet material of claim 1, wherein the ridges have a height of about ten to twenty mils.

6. The sheet material of claim 1, wherein the twisted tapes are laid on top of and follow a same weaving path of an untwisted tape.

\* \* \* \* \*